United States Patent [19]
Konitzer et al.

[11] Patent Number: 5,799,779
[45] Date of Patent: Sep. 1, 1998

[54] INTERLOCKING CARRIER AND CONVEYOR SYSTEM

[75] Inventors: John Konitzer, Woodbury, Minn.; Steven Kostrova, Lindenhurst, Ill.

[73] Assignee: Tetra Laval Holdings & Finance, SA, Pully, Switzerland

[21] Appl. No.: 701,497

[22] Filed: Aug. 22, 1996

[51] Int. Cl.⁶ .................................................. B65G 47/86
[52] U.S. Cl. ............................................... 198/803.15
[58] Field of Search .................... 198/803.01, 803.14, 198/803.15, 803.7

[56] References Cited

U.S. PATENT DOCUMENTS

| | | | |
|---|---|---|---|
| 485,501 | 11/1892 | Langford . | |
| 531,306 | 12/1894 | Essex . | |
| 690,934 | 1/1902 | Dick . | |
| 2,354,939 | 8/1944 | Brock | 198/803.15 |
| 2,382,619 | 8/1945 | Earp | 198/803.15 |
| 2,698,076 | 12/1954 | Nilsson | 198/803.15 |
| 2,817,429 | 12/1957 | Vanderslice et al. | 198/803.15 |
| 3,348,658 | 10/1967 | Cannon | 198/803.15 |
| 3,851,747 | 12/1974 | Van Der Roer | 198/803.15 |
| 4,490,970 | 1/1985 | Curl . | |
| 5,151,556 | 9/1992 | Maher et al. | 198/803.15 |
| 5,303,818 | 4/1994 | Gruettner et al. . | |
| 5,330,046 | 7/1994 | Yuzawa et al. . | |
| 5,488,812 | 2/1996 | Stark et al. . | |

*Primary Examiner*—Joseph E. Valenza
*Assistant Examiner*—Khoi H. Tran
*Attorney, Agent, or Firm*—Michael A. Catania

[57] ABSTRACT

The present invention encompasses an interlocking carrier and a conveyor system composed of a plurality of the interlocking carriers. The interlocking carrier generally consists of a sleeve for the placement of cargo therein, at least one carrier guide and at least one guide support. The interlocking carrier may be a single molded article which is generally symmetrical about a midpoint axis. The interlocking carrier's symmetry allows for the formation of an endless chain of interlocking carriers based on a single mold. The design of the interlocking carrier also allows for the facilitated assembly of an endless chain of interlocking carriers without the necessity of tools, nuts and bolts. The conveyor system of the present invention is adaptable to a various assortment of packaging machines, and may replace an existing conveyor system or be an integrated component. The interlocking carrier is generally designed to convey partially formed cartons, however the interlocking carrier may be adapted to a multitude of cargo. Each individual interlocking carrier is also able to support and control a conveyable cargo by itself.

7 Claims, 3 Drawing Sheets

INTERLOCKING CARRIER AND CONVEYOR SYSTEM

TECHNICAL FIELD

The present invention relates to conveyor systems and carriers used therein. Specifically, the present invention relates to an interlocking carrier and a conveyor system which utilizes the interlocking carrier.

BACKGROUND

A current focus of contemporary machinery is the simplification of assembly and disassembly through the similarity of parts and the diminishment of the use of tools. In the field of conveyors, some inventions have intentionally or inadvertently embraced this focus of contemporary machinery.

An example is Yuzawa et al, U.S. Pat. No. 5,330,046, for a Ceramic Conveyor Belt, which discloses a ceramic conveyor belt assembly consisting of the interconnecting of two different ceramic belt parts which themselves are composed of a number of different subparts which are connected to form the two different ceramic parts. The primary object of Yuzawa et al is to provide a ceramic conveyor belt which is highly resistant to temperature and chemicals, will not rust, and will suffer little loss in strength at high temperatures.

A further example is Curl, U.S. Pat. No. 4,490,970, for a Conveyor Link, which discloses a link for joining metal rods consisting of an elastomer elongated body and a pair of rod locking means, having a spring means, for accepting the metal rods to form metal rod conveyor sub-assembly. It is a primary object of the present invention to provide a link conveyor whereby straight, unbent rods may be utilized.

The need for simplification of assembly and disassembly has become of enormous importance within the field of packaging machines intended for rapid, continuous filling and sealing of a very large number of identical or similar packaging containers such as packaging containers for milk, juice and the like.

Packaging machines are known that integrate the various components necessary to fill and seal a container into a single machine unit. This packaging process, generally stated, includes feeding carton blanks into the machine, forming cartons from the carton blanks, sealing the bottom of the cartons, filling the cartons with a desired contents, sealing the tops of the cartons, and then off loading the filled cartons for shipping.

Packaging machines may employ endless rotating conveyors that allow various packing processes to be performed repeatedly as the conveyor transports the cartons between a plurality of processing stations. These endless rotating conveyors may include a plurality of carriers that are located around a conveyor loop. The carriers accept individual cartons that are continuously fed onto the machine by means of an infeeder, and convey them along to the various processing stations.

A carton undergoing processing has in the past been guided by at least two carriers on the conveyor system to ensure control of the carton. The progression of packaging machines toward even greater compactness necessitates a single carrier which is able to adequately control a carton without the aid of an additional carrier. It would also be a great assistance to the packaging industry if the conveyor system was adaptable to various machines, especially in the case of the cannibalization of one machine for use as spare parts for other machines.

SUMMARY OF THE INVENTION

The present invention fulfills the needs of the packaging industry by providing an interlocking carrier and a conveyor system for integration with a packaging machine which may be easily assembled and is adaptable to various machines.

One aspect of the present invention is an interlocking carrier for utilization in conjunction with a conveyance system having at least one track. The interlocking carrier comprises a sleeve for the placement of cargo therein, at least one carrier guide and at least one guide support. The sleeve has an internal surface and an external surface. The carrier guide is mounted fixedly on the external surface of the sleeve, and has a plurality of slots therethrough. The guide support is disposed along the track and engaged to the corresponding slot of the plurality of slots by placement of the guide support therethrough. The guide support may be a substantially cylindrical rod of a predetermined length and circumference, substantially perpendicularly engaged to the carrier guide. The sleeve may be symmetrical about a midpoint axis and is open at its vertical ends for the longitudinal placement of a cargo therein and the horizontal transport thereof along the conveyance system. The sleeve may be designed for the secure placement and conveyance of a partially formed carton. The sleeve, the carrier guide and the guide support may be a single molded article. The interlocking carrier may further comprise an upper carrier guide and a lower carrier guide wherein the at least one carrier guide is the lower carrier guide. The interlocking carrier may still further comprise a second guide support wherein the at least one and second guide supports are both engaged to the plurality of slots of only one of the carrier guides. The substantially cylindrical rod may symmetrically protrude through the corresponding slot of the plurality of slots. The cargo placed in the sleeve may be guided along the conveyance system by a single interlocking carrier.

Another aspect of the present invention is a conveyor system which comprises a pair of drive wheels, at least one track and a plurality of interlocking carriers. The pair of drive wheels each have an outer surface and an inner surface, and each of the drive wheels have a plurality of grooves on the outer surface. The track has a generally linear section and a generally curved section. The track further has a guide channel defined by sidewalls. Each of the plurality of interlocking carriers comprises a sleeve for the placement of cargo therein, at least one carrier guide and at least one guide support. The sleeve has an internal surface and an external surface. The carrier guide is mounted fixedly on the external surface of the sleeve, and has a plurality of slots therethrough. The guide support is disposed along the track and engaged to the corresponding slot of the plurality of slots by placement of the guide support therethrough. The plurality of guide supports are driven along the at least one track through engagement with the plurality of grooves of the pair of drive wheels, the transverse movement of the plurality of guide supports limited by the sidewalls of the at least one track. The guide support may be a substantially cylindrical rod of a predetermined length and circumference, substantially perpendicularly engaged to the carrier guide. The sleeve may be symmetrical about a midpoint axis and is open at its vertical ends for the longitudinal placement of a cargo therein and the horizontal transport thereof along the conveyance system. The sleeve may be designed for the secure placement and conveyance of a partially formed carton. The sleeve, the carrier guide and the guide support may be a single molded article. The interlocking carrier may further comprise an upper carrier guide and a lower carrier guide wherein the at least one carrier guide is the lower carrier guide. The interlocking carrier may still further comprise a second guide support wherein the at least one and second guide supports are both engaged to the plurality of slots of only one of the carrier guides. The substantially cylindrical rod may symmetrically protrude through the corresponding slot of the plurality of slots. The cargo placed in the sleeve may be guided along the conveyance system by a single interlocking carrier. The track may be formed as an oval and is disposed horizontally. The engagement of the plurality of guide supports with each of the corresponding plurality of slots of the neighboring interlocking carriers may result in the formation of an endless chain substantially perpendicular to the track. The present may further comprise an additional track lying parallel to and above the first track.

Having briefly described this invention, the above and further objects, features and advantages thereof will be recognized by those skilled in the pertinent art from the following detailed description of the invention when taken in conjunction with the accompanying drawings.

BRIEF DESCRIPTION OF THE DRAWINGS

Several features of the present invention are further described in connection with the accompanying drawings in which:

There is illustrated in FIG. 1 one embodiment of the interlocking carrier of the present invention.

Figure 2:
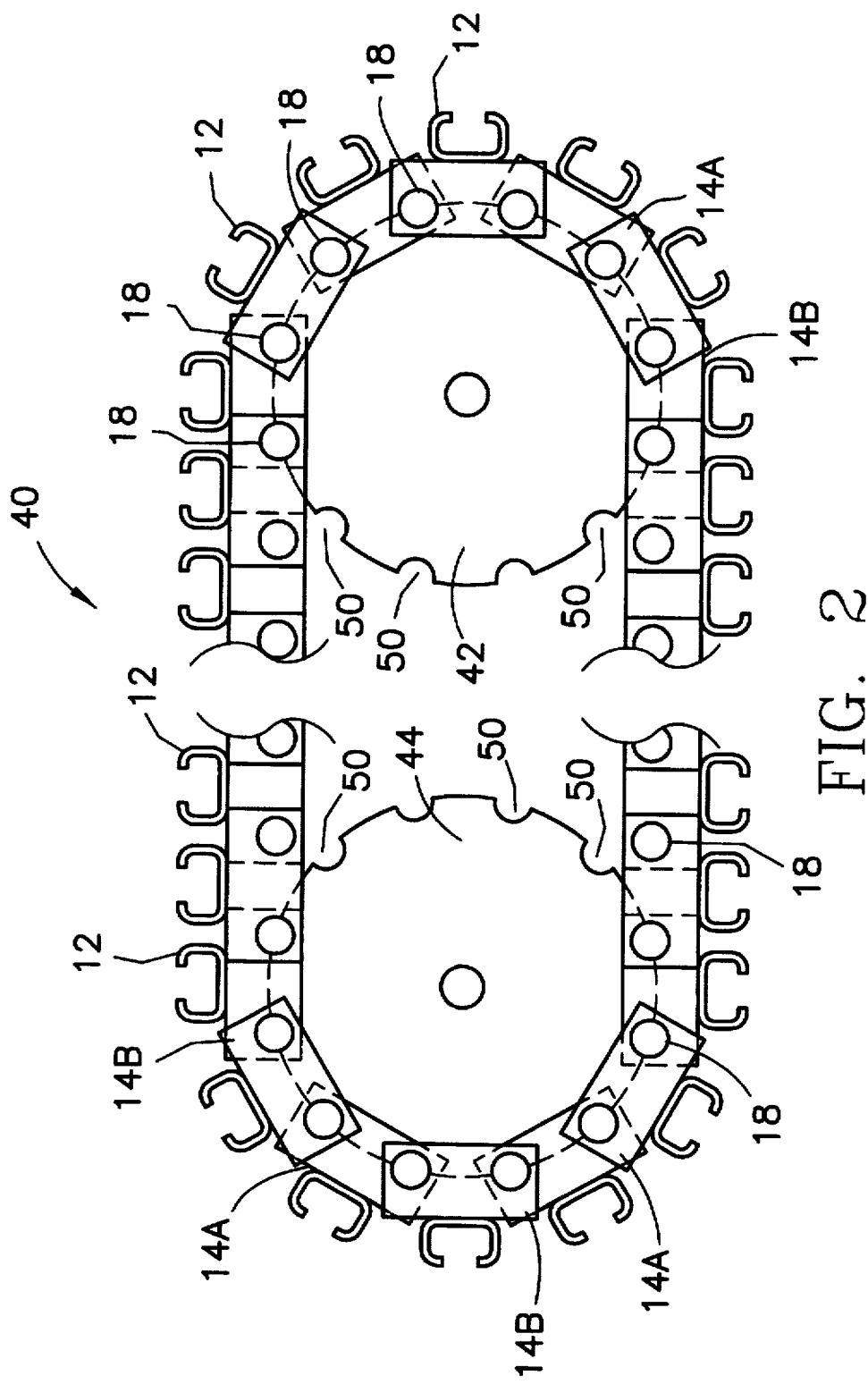

There is illustrated in FIG. 2 a top perspective of an embodiment of a conveyor system of the present invention.

Figure 3:
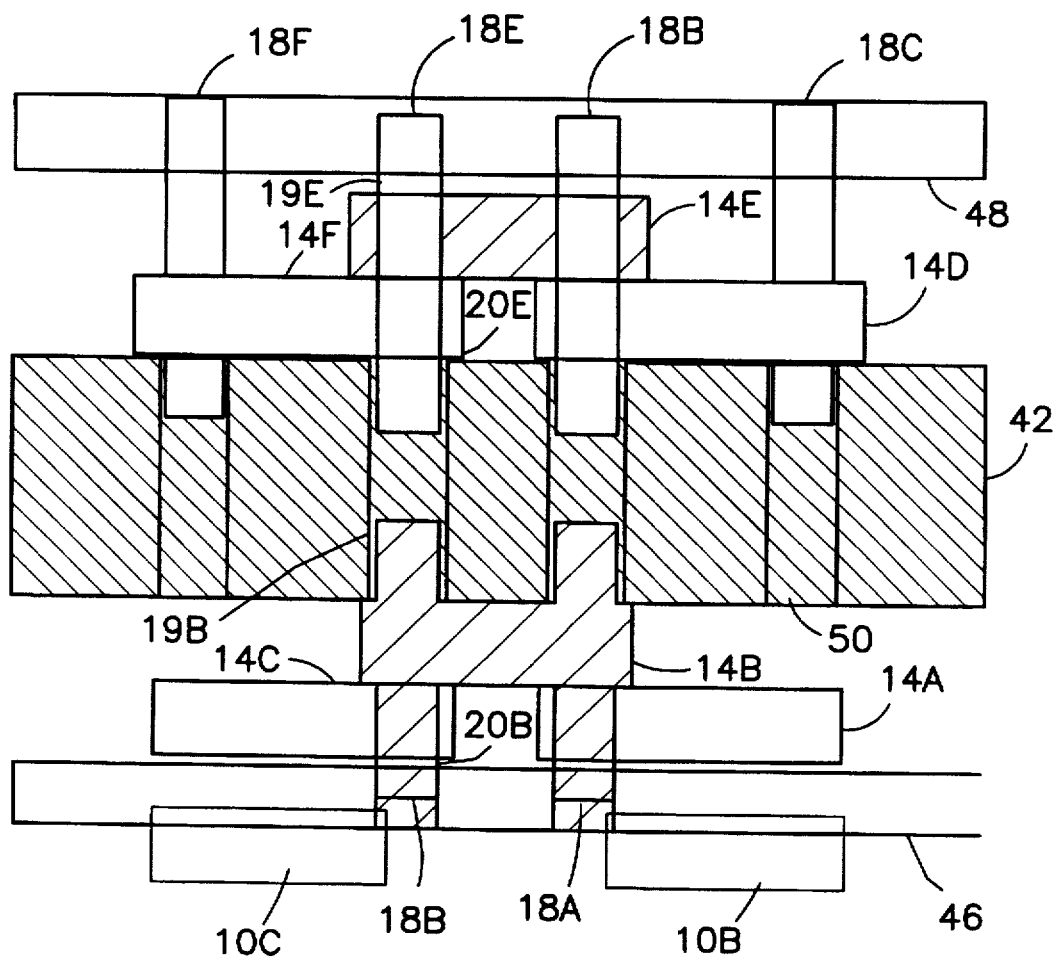

There is illustrated in FIG. 3 a front perspective view of neighboring interlocking carriers interconnected to one another with their respective sleeves removed to demonstrate the interconnection of interlocking carriers.

DETAILED DESCRIPTION OF THE PREFERRED EMBODIMENTS

Figure 1:
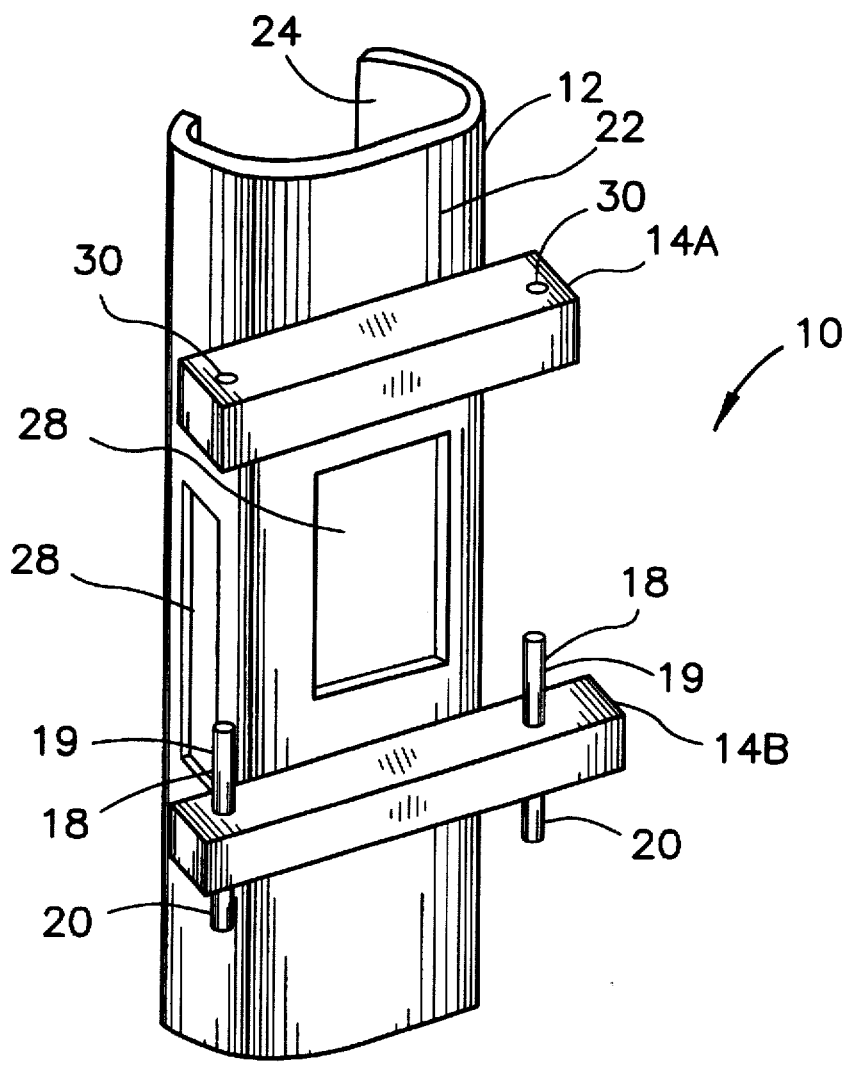

There is illustrated in FIG. 1 one embodiment of the interlocking carrier of the present invention. As shown in FIG. 1, the interlocking carrier is generally designated 10. The interlocking carrier 10 is generally composed of a sleeve 12, a pair of carrier guides 14, and a pair of guide supports 18. The sleeve 12 has an external surface 22 and an internal surface 24, and is shaped to accommodate a cargo which will be transported along the conveyor system. In FIG. 1, the sleeve 12 is shaped to transport a partially formed carton such as one utilized for gabled top cartons. However, the sleeve 12 may be configured to various shapes to accommodate other cargo. The sleeve 12 is generally elongated with various openings 26 and 28 in order to lessen the mass and materials needed to produce the sleeve 12. The sleeve 12 is opened at its vertical ends, the top and bottom, to allow for the longitudinal placement of a cargo therein.

The pair of carrier guides 14 are mounted fixedly on the external surface 22 of the rear of sleeve 12. As shown in FIG. 1, the pair of carrier guides 14 are generally rectangular in shape and mounted parallel to each other with one carrier guide being an upper carrier guide 14A and the other carrier guide being a lower carrier guide 14B. As shown in FIG. 1, the upper carrier guide 14A has a pair of slots 30 located generally at each horizontal end for the vertical placement of guide supports therethrough.

The guide supports 18 connected to the lower carrier guide 14B allow for attachment of the interlocking carrier 10 to other neighboring interlocking carriers thereby forming an endless chain of interlocking carriers. The guide supports 18 are generally cylindrical rods of a predetermined length and circumference. However, those skilled in the pertinent art will recognize that the guide supports may be of other configurations. The predetermined length of the guide supports 18 corresponds to the length of the sleeve 12, the distance between the upper carrier guide 14A and the lower carrier guide 14B, and to a lesser extent the type of conveyor system. The length must enable the guide support to engage with the slots 30 of an opposite carrier guide located on the neighboring interlocking carriers. The circumference of the guide supports 18 must allow for the placement of the guide supports 18 through the slots 30 of the neighboring interlocking carriers. The guide supports 18 have symmetrical protrusions from both ends of the slots 30 designated as upward protrusion 19 and downward protrusion 20. The placement of the interlocking carriers 10 to form an endless chain will be described in more detail below under the method of assembly.

In a preferred embodiment, the sleeve 12, the pair of carrier guides 14A and 14B, and the pair of guide supports 18 are a single molded article which is symmetrical about an axis located through the center of the sleeve 12. This allows for the same molded article to be used to form an endless chain of interlocking carriers. Thus, the neighboring interlocking carriers of interlocking carrier 10 are rotated 180 degrees about this axis.

There is illustrated in FIG. 2 a top perspective of an embodiment of a conveyor system of the present invention. As shown in FIG. 2, a conveyor system is generally designated 40. The conveyor system 40 is suitable for use in a packaging machine such as the one disclosed in Stark et al, U.S. Pat. No. 5,488,812, for a Packaging Machine which issued on Feb. 6, 1996, and which is hereby incorporated by reference. The conveyor assembly 40 may be used to transfer partially formed cartons, not shown, along a generally oval processing path in which the partially formed cartons are filled and/or sealed. The conveyor assembly 40, as illustrated in the embodiment shown in FIG. 2, is of an endless chain type and includes a plurality of interlocking carriers 10, as previously described above in reference to FIG. 1, a pair of drive wheels 42 and 44 and at least one track 46, not shown.

The pair of drive wheels 42 and 44 each have a plurality of grooves 50 which removably engage the guide supports 18 of each of the interlocking carriers 10 thereby moving an endless chain of interlocking carriers 10 around the pair of drive wheels 42 and 44. Each of the plurality of grooves 50 is configured to match the shape of the guide supports 18 of each of the interlocking carriers 10. As illustrated in the embodiment shown in FIG. 2, each of the plurality of grooves 50 is a semi-circular concave configuration which matches the cylindrical configuration of the guide supports 18 of each of the interlocking carriers 10. Each of the plurality of grooves 50 are uniformly spaced along the outer surface of each of the drive wheels 42 and 44, and correspond to the distance between guide supports 18 of all of the interlocking carriers 10.

To further guide the endless chain of interlocking carriers 10 around the pair of drive wheels 42 and 44, at least one track 46 is included in the conveyor system 40. The track 46 is disposed below the endless chain of interlocking carriers 10. However, other embodiments may have a second track 48 disposed above the endless chain of interlocking carriers 10. Both lower track 46 and upper track 48 have sidewalls 52, shown, along the outer periphery of the tracks 46 and 48. The sidewalls 52 prevent any substantial traverse movement of the endless chain of interlocking carriers 10.

The lower and upper tracks 46 and 48 are disposed parallel to one another. The lower and upper tracks 46 and 48 each have linear sections and arcuate sections thereby forming an oval configuration. However, those skilled in the pertinent art will recognize that other configuration are allowable in practicing the present invention. Both, the lower and upper tracks 46 and 48 may be constructed of stainless steel or the like. In addition to guiding the endless chain of interlocking carriers 10 around the drive wheels, the lower track 46 also provides foundational support for the endless chain of interlocking carriers 10 thereby preventing disruption of the endless chain due to gravitational forces.

FIG. 2 illustrates a drive wheel 42 in accordance with one drive mechanism embodiment. The drive wheel 42 is a friction wheel that, for example, may be driven by a high speed, low torque servo motor. Each of the plurality of the grooves 50 of the drive wheels 42 and 44 frictionally engage each of the guide supports 18 of the interlocking carriers 10 to move the endless chain of interlocking carriers 10 around the drive wheels 42 and 44 and also around the tracks 46 and 48. Alternatively, an electric motor or the like may be used to drive the wheels 42 and 44. If a low torque servo motor is employed, a gearing mechanism may be included to increase the torque applied to the drive wheels 42 and 44.

There is illustrated in FIG. 3 a front perspective view of neighboring interlocking carriers interconnected to one another with their respective sleeves removed to demonstrate the interconnection of the interlocking carriers. To facilitate the description of the interconnection of the interlocking carriers 10, the carrier guides 14 will be designated as 14A, 14B, 14C, 14D, 14E and 14F, and the guide supports 18 will be designated as 18A, 18B, 18C, 18D, 18E and 18F. As illustrated in FIG. 3, there is the drive wheel 42 having a plurality of grooves 50 along its outer surface. An upper track 48 and a lower track 46 define the upper and lower boundaries of the conveyor system 40. The carrier guides 14A-F and guide supports 18A-F define the skeletons of three interlocking carriers 10A-C interconnected to one another. The carrier guides 14B and 14E are the lower carrier guide and upper carrier guide, respectively, of a single interlocking carrier 10A. The guide supports 18A and 18B also are part of the skeleton of interlocking carrier 10A. The carrier guides 14A and 14D are the lower carrier guide and upper carrier guide, respectively, of a single interlocking carrier 10B. The guide supports 18C and 18D also are part of the skeleton of interlocking carrier 10B. The carrier guides 14C and 14F are the lower carrier guide and upper carrier guide, respectively, of a single interlocking carrier 10C. The guide supports 18E and 18F are also part of the skeleton of interlocking carrier 10C. As is apparent, the interlocking carriers 10A-C are interchangeable, with each successive interlocking carrier 10 rotated 180 degrees from the prior interlocking carrier.

Each of the carrier guides 14A, 14C and 14E have a pair of slots 30, not shown, in which a guide support 18 from a neighboring interlocking carrier may be placed therethrough. As shown in FIG. 3, the downward protrusion 20A of the guide support 18A of interlocking carrier 10A is placed therethrough the left slot 30 of lower carrier guide 14A of the interlocking carrier 10B. The downward protrusion 20B of the guide support 18B of the interlocking carrier 10A is placed therethrough the right slot 30 of lower carrier guide 14C of the interlocking carrier 10C. The downward protrusions 20A and 20B further protrude through the slots 30 of carrier guides 14A and 14C to engage with the lower track 46 for foundational support of the endless chain of interlocking carriers 10 and to prevent transverse motion of the endless chain of interlocking carriers 10. The transverse motion is further prevented by sidewall 52 of the lower track 46.

As shown in FIG. 3, the upward protrusion 19D of the guide support 18D of interlocking carrier 10B is placed therethrough the right slot 30 of upper carrier guide 14E of the interlocking carrier 10A. The upward protrusion 19E of the guide support 18E of the interlocking carrier 10C is placed therethrough the left slot 30 of upper carrier guide 14E of the interlocking carrier 10A. The upward protrusions 19D and 19E further protrude through the slots 30 of carrier guide 14E to engage with the upper track 48 to prevent the transverse motion of the endless chain of interlocking carriers 10. Upward protrusions 19C and 19F also engage with the upper track 48. The transverse motion is further prevented by sidewall 52 of the upper track 48.

The upward protrusions 19A and 19B, and the downward protrusions 20C-20F frictionally engage with the plurality of grooves 50 of the drive wheel 42. In this manner the drive wheel 42, along with the second drive wheel 44, not shown, move the endless chain of interlocking carriers 10 around the tracks 46 and 48, thereby transporting cargo from one location to another.

METHOD OF ASSEMBLY

The following is a description of a preferred method of assembling the plurality of interlocking carriers to form an endless chain component of a conveyance system. However, those skilled in the pertinent art will recognize that may other methods of assembly may be employed in practicing the present invention and that methods of assembly will vary according to the requirements of the conveyance system.

As previously mentioned, the interlocking carrier 10 as described in reference to FIG. 1 may be a single molded article composed, for example, from a polyamide material or the like. The interlocking carrier 10 is symmetrical about a central axis except for the placement of the guide supports 18. Thus, if an interlocking carrier 10 having the guide supports 18 located on its lower carrier guide 14B is rotated 180 degrees, the rotated interlocking carrier 10 will have the guide supports 18 located on its upper carrier guide 14A. In this manner, a single mold may be used to produce all the components of the endless chain of interlocking carriers 10. As had been explained in reference to FIG. 3, the guide supports 18 of one interlocking carrier 10 are placed therethrough the slots 30 of each of the carrier guides of the neighboring interlocking carriers 10. The guide supports 18 of the neighboring interlocking carriers 10 are then placed through the slots 30 of the central interlocking carrier 10.

The novel design of the present invention allows for the assembly of an endless chain of interlocking carriers 10 without the necessity of tools, screws or bolts. The novel design also decreases the time necessary to assemble and disassemble a conveyor system, and provides for application to numerous machinery. The design of the interlocking carrier 10 of the present invention also provides for total control of a cargo placed therein by a single interlocking carrier 10 throughout the entire conveyance duration for the cargo. This total control feature of the present invention allows for a further decrease in space for a conveyor system.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim as our invention:

1. A conveyor system comprising:

a pair of drive wheels, each of the drive wheels having an outer surface and an inner surface, and each of the drive wheels having a plurality of grooves on the outer surface;

at least one track having a generally linear section and a generally curved section, the at least one track further having a guide channel defined by sidewalls; and a plurality of interlocking carriers, each of the plurality of interlocking carriers comprising a sleeve for the placement of cargo therein, the sleeve having an internal surface and an external surface, an upper carrier and a lower carrier guide, each mounted fixedly on the external surface of the sleeve, each of upper and lower carrier guides having a plurality of slots therethrough, and a plurality of guide supports, each of the plurality of guide supports disposed along the at least one track and engaged to each of the corresponding plurality of slots of one of the upper and lower carrier guides by placement of each of the corresponding plurality of guide supports through a corresponding slot of the plurality of slots;

whereby the plurality of guide supports are driven along the at least one track through engagement with the plurality of grooves of the pair of drive wheels, the transverse movement of the plurality of guide supports limited by the sidewalls of the at least one track.

2. The conveyor system according to claim 1 wherein the sleeve is designed for the secure placement and conveyance of a partially formed carton.

3. The conveyor system according to claim 1 wherein the sleeve is symmetrical about a midpoint axis and is open at its vertical ends for the longitudinal placement of a cargo therein and the horizontal transport thereof along the conveyance system.

4. The conveyor system according to claim 1 wherein the track is formed as an oval.

5. The conveyor system according to claim 1 wherein the track is disposed horizontally.

6. The conveyor system according to claim 1 wherein the engagement of the plurality of guide supports with each of the corresponding plurality of slots of the neighboring interlocking carriers results in the formation of an endless chain substantially perpendicular to the at least one track.

7. A conveyor system comprising:

a pair of drive wheels, each of the drive wheels having an outer surface and an inner surface, and each of the drive wheels having a plurality of grooves on the outer surface;

at least one track having a generally linear section and a generally curved section, the at least one track further having a guide channel defined by sidewalls; and a plurality of interlocking carriers, each of the plurality of interlocking carriers a single molded article comprising a sleeve for the placement of cargo therein, the sleeve having an internal surface and an external surface, a upper carrier guide and a lower carrier guide, each disposed at the external surface of the sleeve, the upper carrier guides having a plurality of slots therethrough, and the lower carrier guides having a plurality of guide supports, each of the plurality of guide supports disposed along the at least one track and engaged to each of the corresponding plurality of slots of the adjacent carrier guides by placement of each of the corresponding plurality of guide supports therethrough wherein each of the plurality of guide supports is a substantially cylindrical rod of a predetermined length and circumference, substantially perpendicularly engaged to each of the corresponding upper carrier guides;

whereby the plurality of guide supports are driven along the at least one track through engagement with the plurality of grooves of the pair of drive wheels, the transverse movement of the plurality of guide supports limited by the sidewalls of the at least one track.

* * * * *